E. F. PARKS.
INSECT TRAP.
APPLICATION FILED DEC. 7, 1920.
1,380,585. Patented June 7, 1921.
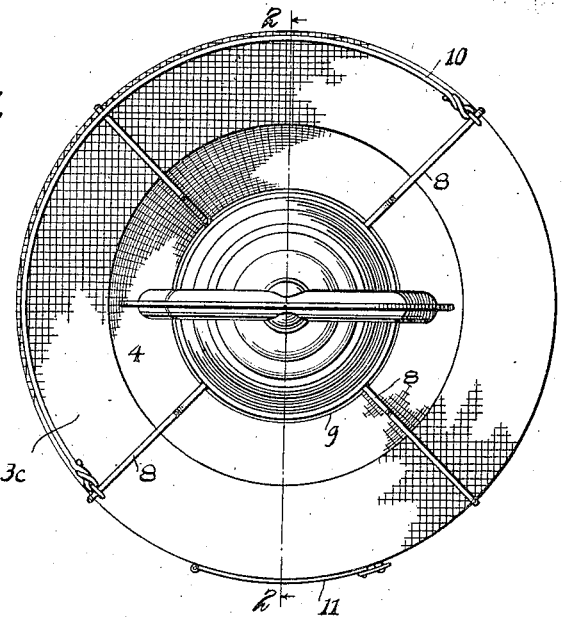
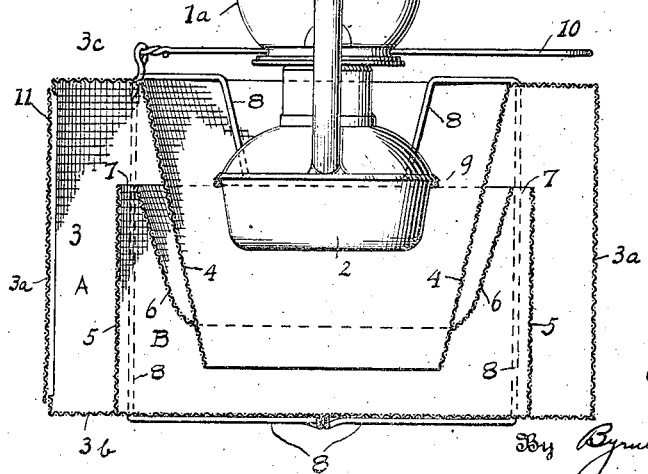

UNITED STATES PATENT OFFICE.

EUGENE F. PARKS, OF WINSTON-SALEM, NORTH CAROLINA.

INSECT-TRAP.

1,380,585. Specification of Letters Patent. Patented June 7, 1921.

Application filed December 7, 1920. Serial No. 428,950.

*To all whom it may concern:*

Be it known that I, EUGENE F. PARKS, a citizen of the United States, residing at Winston-Salem, in the county of Forsyth and State of North Carolina, have invented certain new and useful Improvements in Insect-Traps, of which the following is a specification.

This invention relates to insect traps in general, but more particularly to a device for trapping the tobacco moth.

I am fully aware that insect traps have been proposed or used heretofore, the object of this invention being a trap construction which is more efficient and yet simple and cheap of construction.

For a full understanding of the invention reference is had to the accompanying drawings in which—

Figure 1 is a plan of a trap construction embodying the invention; and

Fig. 2 is a section of the same on line 2—2.

At the very outset it may be stated that the particular source of illumination is of secondary importance. Within the scope of the invention various forms of lamps or lights may be used, but I preferably use an ordinary wick lamp having a chimney 1 and fuel container 2. I preferably employ a chimney which has a rounded or sphere-shaped lower portion 1$^a$.

While there is also considerable latitude as to the form of the trap proper, the particular form shown may be considered as a preferred embodiment of the invention illustrating best the characteristics thereof.

In the drawings 3 is an outer casing of about ¼″ mesh galvanized iron wire screen. This casing consists of a cylindrical wall 3$^a$, a bottom 3$^b$ and an upper annular portion 3$^c$.

From the inner edge of the annular portion 3$^c$ extends downwardly, in the form of a hopper, a fine wire screen 4 having the form of an inverted truncated cone, the lower edge of which is spaced a short distance from the bottom 3$^b$ of the casing.

Within the space defined by the wall 3$^a$ and the screen 4, which is preferably of 1/16″ mesh wire, is disposed a shorter wire screen cylinder 5 and an apron 6 extending upwardly and outwardly from the screen 4.

The cylinder 5 and apron 6, which may also be of about ¼″ mesh wire screen are so disposed relatively to each other that their upper edges define an annular trap opening 7.

To afford a simple and cheap support for the lamp, I preferably use a wire frame consisting of a plurality of wires 8 extending, upwardly along the outer surface of the wall 3$^a$, then radially inwardly over the annular portion 3$^c$ and downwardly and inwardly, forming a circular seat 9 for the container 2. The wires 8 are preferably interconnected below the bottom 3$^b$ in the form of a spider or in any other suitable manner.

The trap structure is thus cheaply made and forms a compact arrangement, the wires 8 constituting the skeleton thereof.

In the particular form shown I have used four wire units spaced 90° apart and have attached a wire bail 10 at opposite points so that the trap proper may be easily carried. It is understood, however, that the skeleton frame may have different shapes.

To facilitate the cleaning of the trap, I provide a door 11 in the casing, preferably in the wall 3$^a$.

The operative significance of the arrangement is as follows:

The insect, or the tobacco moth in particular, is attracted by the light. As is the almost invariable rule it will approach the light with considerable speed and strike against the cylinder with comparatively great force. The impact stuns the moth and it falls downwardly, the direction of fall being made more certain by the inclination of the chimney directly in front of the burner which causes the deflection of the insect according to well known laws of physics.

The action so far described is not different from that taking place in other traps devised or attempted. It is merely based on the universally known fact that the moths or similar night insects are attracted to the light and striking a protecting screen or chimney are momentarily unbalanced.

To take the greatest advantage of the unbalanced condition or of the stunning of the insect, my device includes two characteristic features. The first one is instrumental in facilitating the fall of the insect to a selected place where its sense of orientation is confused and the second feature is instrumental in leading it into the trap proper.

The first object is attained by making the downward passage into the trap practically unimpeded. The screen 4 is nearly perpendicular and there are no ledges or abutments for the insect to recover its balance. The element 4 could be a smooth continuous surface, so far as its function to precipitate the moth to the bottom is concerned and while I have shown it as consisting throughout of fine screen wire, I may use for its lower portion material which is not perforated. The upper surface, however, should be perforated or otherwise transparent to allow the light to pass through it. I have found that fine mesh wire does not afford the insect a sufficient hold to recover its balance. It will continue the fall until it reaches the bottom.

The zone where it lands is dark, being directly below the container 2. Since the light can pass through the wire structure of both screen 4 and casing 3, the zone surrounding the trap and the wall 3ª itself are illuminated and due to the irresistible instinct the moth will try to get away in the direction of the light. It is still partly stunned and crawls outwardly into the space marked B. Encountering the screen cylinder 5 it will crawl up still trying to get toward the light until it passes through the trap opening 7. After it has passed through this opening into the space or chamber marked A, it is practically cut off from retreat.

Thus the instinct of the insect has been taken advantage of to the fullest possible extent to produce a simple cheap and yet highly efficient trap.

While the apron 6 is not absolutely essential, I have resorted to it as an expedient to allow the cylindrical screen 5 to be moved outwardly as far as possible to initially draw the insect away from the central portions as far as possible. Once the insect is in the illuminated part of the trap, it does not return back to the dark central zone.

In the foregoing I have described one concrete example indicating generally the principle upon which the invention is based. It is readily apparent that various changes or modifications may be made within the broader scope of the disclosure.

The element 4 thus could be made of transparent material such as glass, mica, etc., but for practical reasons I prefer to use a wire screen.

Also the wall 3ª could be made of different kinds of material provided it affords a luminous zone surrounding the central dark zone.

It should therefore be understood that the screen or perforated material is primarily resorted to as a cheap transparent material. This applies particularly to the elements 4 and 5 which allow the light to pass from the burner to the lower peripheral portions of the trap and, in case the wall 3ª is transparent or perforated, to the zone surrounding the trap. The transparency of the element 5 simultaneously transmits light from the surrounding illuminated zone to the central zone to cause the insect to crawl into the trap.

In the embodiment of the invention illustrated the fuel container acts as a screen to produce a zone of relative darkness below the source of light. It is understood that in connection with an electric light having a downwardly projecting bulb or any other similar arrangement a separate screen must be used to produce the zone of darkness.

I claim:—

1. Apparatus for trapping insects, comprising a central hopper, a chamber surrounding the hopper, means defining a trap opening therebetween, a source of light disposed immediately above the hopper and means operative to produce a zone of relative darkness in the hopper below the source of light and an illuminated zone outwardly from said zone of darkness.

2. Apparatus for trapping insects, comprising a central hopper, a chamber surrounding the hopper, means defining a substantially continuous trap opening therebetween, a source of light disposed above the hopper and means operative to produce a zone of relative darkness in the hopper below the source of light and an illuminated zone outwardly from said zone of darkness.

3. Apparatus for trapping insects, comprising a central hopper, a chamber surrounding the hopper, means defining an annular trap opening therebetween, a source of light disposed above the hopper and means operative to produce a zone of relative darkness in the hopper below the source of light and an illuminated zone outwardly from said zone of darkness.

4. Apparatus for trapping insects comprising a central hopper, a chamber, surrounding the hopper, means defining an annular trap opening therebetween, said means including a cylindrical element disposed between the hopper and the peripheral wall of the chamber, a source of light disposed above the hopper and means operative to produce a zone of relative darkness in the hopper below the source of light and an illuminated zone outwardly from said zone of darkness.

5. Apparatus for trapping insects, comprising a central hopper, a chamber surrounding the hopper, means defining an annular trap opening therebetween, said means including a cylindrical element disposed between the hopper and the peripheral wall of the chamber and an apron extending upwardly from the outer side of the hopper, a source of light disposed above the hopper and means operative to produce a zone of relative darkness in the hopper below the source of light and an illuminated zone outwardly from said zone of darkness.

6. Apparatus for trapping insects, comprising a central hopper, a chamber surrounding the hopper, means defining a trap opening therebetween, a part of the hopper above the trap opening being transparent, a source of light immediately above the hopper and means operative to produce a zone of relative darkness in the hopper below the source of light.

7. Apparatus for trapping insects, comprising a central hopper of reticulated material, a chamber surrounding the hopper, means defining a trap opening therebetween, said means including a reticulated cylindrical wall, a source of light immediately above the hopper and means operative to produce a zone of relative darkness in the hopper below the source of light.

8. Apparatus for trapping insects, comprising a central hopper, a chamber surrounding the hopper, means defining a trap opening therebetween, the structure composing said parts being of wire screen, a source of light immediately above the hopper and means operative to produce a zone of relative darkness in the hopper below the source of light.

9. Apparatus for trapping insects, comprising a central hopper, a chamber surrounding the hopper, means defining a trap opening therebetween, said means including a cylindrical wall extending upwardly from the bottom of the chamber, and an apron extending upwardly from the outer surface of the hopper, the structure composing said parts being of wire screen, a source of light immediately above the hopper and means operative to produce a zone of relative darkness in the hopper below the source of light.

10. Apparatus for trapping insects, comprising a central hopper, a chamber surrounding the hopper and having its bottom spaced from the lower end of the hopper, a cylindrical wall extending upwardly from the bottom of the chamber, an apron extending upwardly from the outer surface of the hopper and defining with the upper edge of the cylindrical wall an annular trap opening, the structure comprising all said parts being of wire screen, a source of light immediately above the hopper and means operative to produce a zone of relative darkness in the hopper below the source of light.

11. Apparatus for trapping insects, comprising a central hopper, a chamber surrounding the hopper and having its bottom spaced from the lower end of the hopper, a cylindrical wall extending upwardly from the bottom of the chamber, an apron extending upwardly from the outer surface of the hopper and defining with the upper edge of the cylindrical wall an annular trap opening, the structure comprising all said parts being of wire screen and a skeleton frame connected with said structure providing a central support within the hopper for a source of light.

12. Apparatus for trapping insects, comprising a central hopper, a chamber surrounding the hopper and having its bottom spaced from the lower end of the hopper, a cylindrical wall extending upwardly from the bottom of the chamber, an apron extending upwardly from the outer surface of the hopper and defining with the upper edge of the cylindrical wall an annular trap opening, the structure comprising all said parts being of wire screen and a skeleton frame connected with said structure providing a central support within the hopper for the fuel container of a lamp.

In testimony whereof I affix my signature.

EUGENE F. PARKS.